United States Patent
Ritchie

[15] 3,648,578
[45] Mar. 14, 1972

[54] APPARATUS FOR AUTOMATICALLY DRAWING LINES

[72] Inventor: David Scarth Ritchie, Glasgow, Scotland
[73] Assignee: Barr and Stroud Limited, Glasgow, Scotland
[22] Filed: Aug. 31, 1970
[21] Appl. No.: 68,332

[30] Foreign Application Priority Data

Sept. 10, 1969 Great Britain.....................44,711/69

[52] U.S. Cl. ................................................................95/12
[51] Int. Cl. .........................................................B431 13/18
[58] Field of Search ........................................95/1, 4, 5, 12

[56] References Cited

UNITED STATES PATENTS 3,330,182  7/1967  Gerber.........................................95/1

Primary Examiner—John M. Horan
Attorney—Mason, Fenwick & Lawrence

[57] ABSTRACT

Apparatus for automatically tracing lines, for example for cartographic purposes, in accordance with recorded data specifying coordinates of points on the lines to be traced specified with respect to reference axes, and a method for automatically tracing such a line. The apparatus includes a source of light and optical elements for projecting a beam of light from the source onto a photographically sensitized surface, an adjustable-aperture diaphragm located in the path of the light beam to control the image size, structure for causing automatic relative movement of the light beam with respect to the surface at varying speeds in accordance with the data to produce a trace of the line on the surface, and exposure regulating means for maintaining a pre-determined exposure of the trace on the sensitized surface over the full range of image sizes. The method for automatically tracing the line includes movement of relatively movable carriages in such apparatus which are moved automatically in accordance with the recorded data to effect the relative movement of the projected beam of light over the surface to produce the trace of the line.

7 Claims, 4 Drawing Figures

Patented March 14, 1972

Inventor
DAVID SCARTH RITCHIE
By
Mason, Fenwick & Lawrence
Attorneys

Patented March 14, 1972

Inventor

DAVID SCARTH RITCHIE

By Mason, Fenwick & Lawrence

Attorneys

APPARATUS FOR AUTOMATICALLY DRAWING LINES

This invention relates to apparatus for automatically tracing lines, for example for cartographic purposes.

In our British Pat. No. 1,107,981 we disclose apparatus for automatically tracing a line in accordance with recorded data, the apparatus including two relatively movable carriages which are driven respectively in X and Y directions by two servo-motors in accordance with the recorded data, and the carriages support a light source for projecting a beam of light on to a stationary paper having a photographically sensitized surface, an adjustable-aperture diaphragm for controlling the image size of the light beam, and a dove prism for rotating the image about an axis lying in the path of the beam whereby a projected image may be maintained in a preferred orientation relative to the direction of tracing.

Tachogenerators are connected to the two servo-motors and operate a resolver synchro which has two stator coils. One stator coil is used to operate a third servomotor which drives the rotor of the synchro to the null point and positions the dove prism accordingly; the other stator coil is arranged to control the intensity of the beam of light by varying the voltage applied to the light source, so that the correct exposure for the sensitized paper is maintained over the full range of tracing speeds.

It will be understood that by "correct exposure" is meant that predetermined exposure which produces a trace of uniform intensity when the photo-sensitised paper is developed. Thus, correct exposure for each image may differ, and if a constant tracing speed is used the exposure will differ according to the image size taken between leading and trailing edges thereof in the direction of tracing.

It is an object of the present invention to provide means for maintaining the correct exposure of the sensitized surface over the full range of image sizes.

It is a further object of the present invention to provide means for maintaining correct exposure of the sensitized surface for the full range of image sizes and over the full range of tracing speeds.

It is also an object of the present invention to provide control of the tracing speed in accordance with the image size.

According to the present invention there is provided apparatus for automatically tracing a line in accordance with recorded data which includes the co-ordinates of points on the line to be traced, specified with respect to reference axes, said apparatus including a source of light, first means for projecting a beam of light from said source onto a photographically sensitized surface, an adjustable-aperture diaphragm located in the path of a said beam of light in order to control the image size, second means movable at varying speeds in accordance with said data for automatically moving a said beam of light to produce a trace of said line on said surface, and third means for maintaining a predetermined exposure of the trace on the sensitized surface over the full range of image sizes.

Said third means may control the intensity of the beam or may control the speed of tracing.

Preferably said third means maintains said predetermined exposure over the full range of tracing speeds.

Further according to the present invention there is provided a method of automatically tracing a line in accordance with recorded data which includes the co-ordinates of points on the line to be traced, specified with respect to reference axes, said method including the steps of providing relatively movable carriages, moving the carriages automatically in accordance with said recorded data, in order to move a projected beam of light over a photographically sensitized surface to produce a trace of said line on said surface, controlling the size of the image, and controlling the exposure of the trace on the surface over the full range of image sizes.

An embodiment of the present invention will now be described by way of example, with reference to the accompanying drawings, in which.

Figure 1:
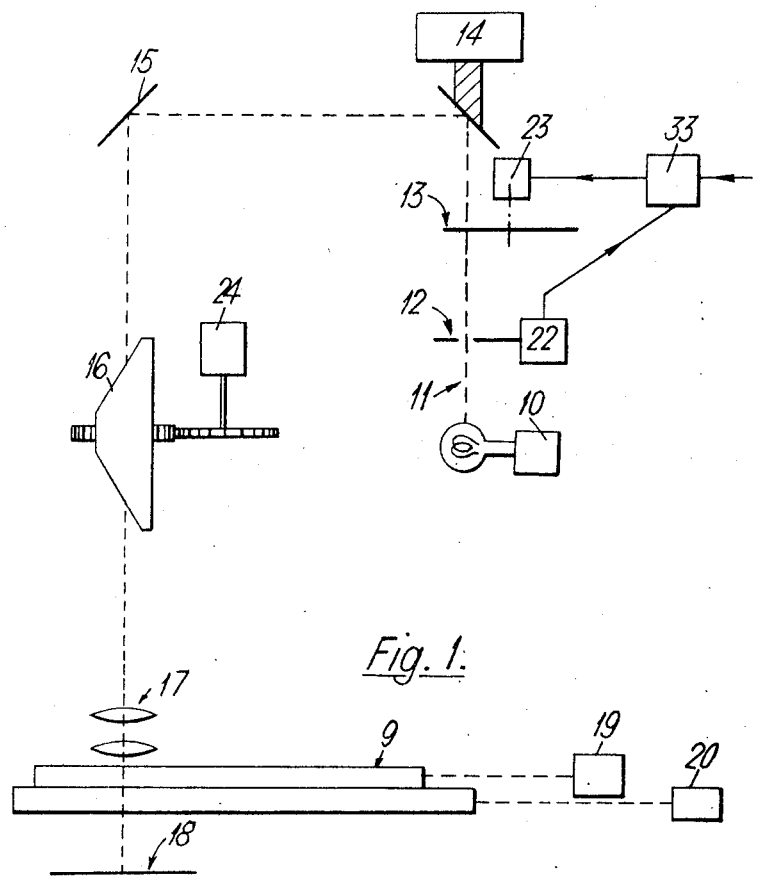
FIG. 1 is a block diagram of apparatus according to the present invention.

As shown in the drawings the apparatus according to the present invention for tracing a line in accordance with recorded data includes a pair of relatively movable carriages 9 supporting a source of light 10 which is capable of emitting a beam of light along a path 11. Located in the path 11 is an adjustable aperture diaphragm 12, a light-attenuating device 13, a beam interrupter 14, a plane mirror 15, a dove prism 16 and a lens 17. The two carriages 9 are arranged to transverse the surface of a stationary photo-sensitised paper 18 in two orthogonal directions, X and Y, and are respectively driven by servo-motors 19, 20 responsive to input signals supplied by a computer 21 (FIG. 2), or other data-storage device, in accordance with the recorded data. The trace interrupter 14 includes a relay which is selectively energized in accordance with the data recorded in the computer in order to provide an interrupted line to be traced on the surface of the photosensitive paper 18.

The diaphragm 12 which may be of the iris type of a plate having a series of holes of varying sizes and arranged to be rotated into position one by one, is driven by a motor 22 controlled from the computer 21, and the device 13, which is in the form of blade to be described hereinafter, is driven by a motor 23 which may be either a servomotor or a torque motor. A motor 24 which may be either a servomotor or a stepper motor drives the dove prism 16.

The carriages 9 may each be arranged to move along straight lines which are at right angles to each other where the points on the line to be traced are specified in cartesian co-ordinates, or one carriage may be arranged to rotate about an axis (not shown) and the other carriage to move radially with respect to that axis when the points on the line to be traced are specified in polar co-ordinates.

Figure 2:
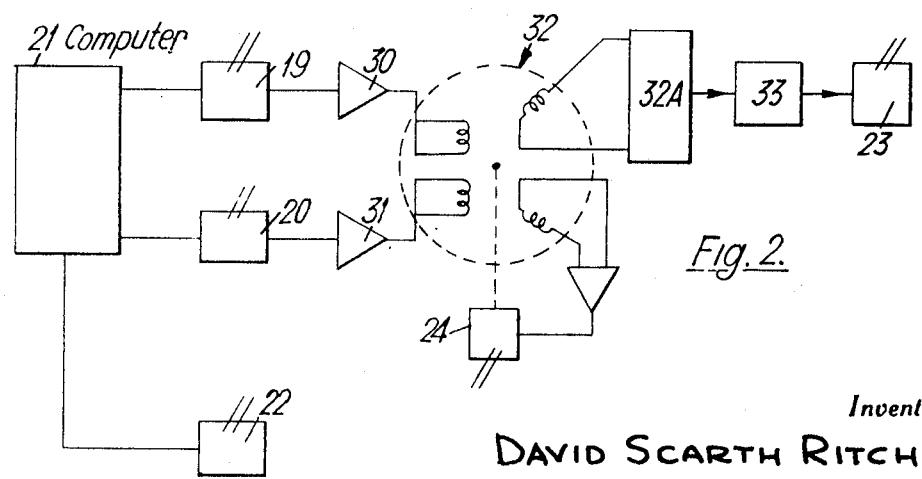
FIG. 2 shows the control circuit for the apparatus.

FIG. 2 shows the control circuit for the apparatus wherein the computer 21 feeds the X and Y carriage motors 19, 20. Tachogenerators (not shown) provide signals representative of the operation of the motors 19, 20, and these signals are fed through isolating amplifiers 30, 21 to the two rotor coils of a resolver synchro 32. In a modification the two rotor coils of the synchro 32 are red directly from the computer 21. The synchro 32 has two stator coils one of which provides a signal to drive the motor 24 which rotates the rotor of the synchro 32 to the null point in conventional manner. As previously mentioned the motor 24 also drives the dove prism 16, so that the dove prism 16 is maintained automatically in a predetermined angular relationship with respect to the direction of tracing. The second stator coil of the synchro 32 provides a signal R when the rotor is in the null position, which is given by the equation $$R = K\sqrt{(V_x)^2 + (V_y)^2}$$

where $K$ is a constant, and $V_x$ and $V_y$ are the respective output voltages from the X and Y drive tachogenerators and is therefore proportional to the tracing speed. The signal $R$ is fed to a rectifier 32A to provide a DC signal which is fed to a control unit 33 for the motor 23 and in this way the intensity of the light beam impinging upon the surface of the paper 18 is controlled so that a constant or predetermined exposure is achieved for all tracing speeds.

Figure 4:
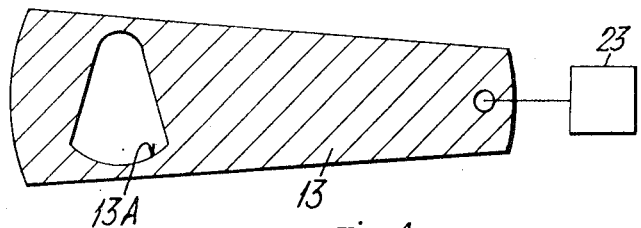
FIG. 4 illustrates a detail of the apparatus.

The device 13, which is shown in detail in FIG. 4 is generally opaque and has an aperture 13A of predetermined shape through which the light beam may be transmitted. The deice 13 is movable by the motor 23 so that variations in the position of the device cause corresponding variations in the area of the aperture 13A in relation to the beam of light thereby wholly obscuring part of the beam, and is located in the path of the beam intermediate object and image in parallel light such that the variations in filter position cause uniform variation in the intensity of light across the image. The aperture 13A is wedge-shaped so as to give a linear variation of intensity control over the normal working range of tracing speeds and to give a more rapid variation of intensity control under starting and stopping conditions. The device may have a plurality of apertures 13A.

Figure 3:
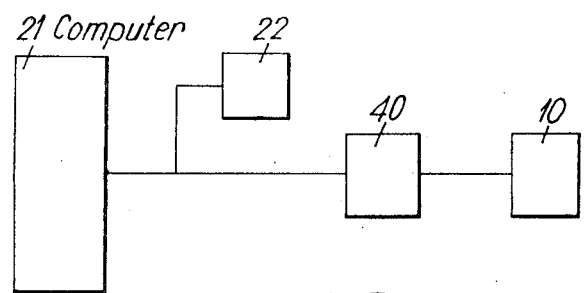
FIG. 3 shows a modified control circuit.

In FIG. 3, the intensity control of the beam according to the image size is achieved by providing a signal from the computer 21 to a control unit 40 which controls the voltage supply to the source 10. The control unit 40 may form part of the computer 21 or alternatively the computer 21 may provide a control signal directly to the motor 23 so as to control the intensity of the beam in accordance with image size.

Various other modifications may be made, for example, the predetermined exposure of the photo-sensitised surface may be achieved by controlling the tracing speed of the apparatus in accordance with the beam size and/or the intensity of the beam of light, the control being effected directly from the computer 21.

Alternatively, a feedback signal is taken from the diaphragm 12, or from the output of the motor 22 controlling the diaphragm 12 and representative of the beam size, and a further feedback signal is taken from the beam itself or from the device 13 or from the output of the motor 23 and representative of the beam intensity, and these two feedback signals are used to optimize the driving speed of the motors 19, 20 so that the predetermined exposure time of the sensitized surface is achieved.

A light-masking element may also be placed in the path 11 in order to split the beam incident thereon into two portions so that two spaced parallel lines may be traced.

Furthermore, as disclosed in our British Pat. No. 1,107,981 symbols may be projected from a transparency and superimposed upon the image in the path 11. In this case the intensity of the image of the symbol may be controlled by a filter similar to that described above with reference to FIG. 1.

What is claimed is:

1. Apparatus for automatically tracing a line in accordance with recorded data which includes the co-ordinates of points on the line to be traced, specified with respect to reference axes, said apparatus including a source of light, first means for projecting a beam of light from said source onto a photographically sensitized surface, an adjustable-aperture diaphragm located in the path of a said beam of light in order to control the image size, second means movable at varying speeds in accordance with said data for automatically moving a said beam of light to produce a trace of said line on said surface, and third means for maintaining a predetermined exposure of the trace on the sensitized surface over the full range of image sizes, said third means comprising a generally opaque apertured member located substantially at a real image of the light source and at a point which is not in focus with the final image on said surface, the apertured member being selectively movable into and out of the light beam by an actuator in order to cause uniform variation in the intensity of light across the image.

2. Apparatus according to claim 1, including a remotely controlled actuator connected to operate said diaphragm.

3. Apparatus according to claim 2, wherein said actuator is a servomotor.

4. Apparatus according to claim 1, wherein said third means also maintains said predetermined exposure over the full range of tracing speeds.

5. Apparatus according to claim 4, wherein said second means includes carriages which are driven by servo-motors and signal combination means is connected to said servo-motors to provide said third means with a signal proportional to tracing speed.

6. Apparatus according to claim 1, wherein said third means is also adapted to control the tracing speed to maintain said predetermined exposure.

7. Apparatus according to claim 1, wherein the source of light is voltage-controlled by said third means.

* * * * *